May 14, 1968   L. P. TINKHAM ET AL   3,382,721
PROBE FOR COLLECTING EXHAUST GAS
Filed Oct. 4, 1965   2 Sheets-Sheet 1
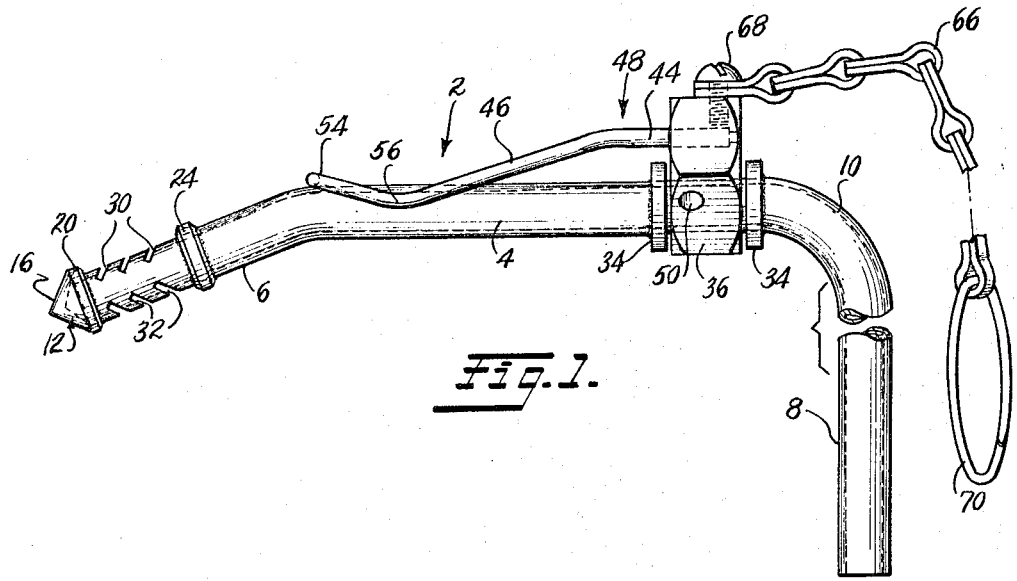
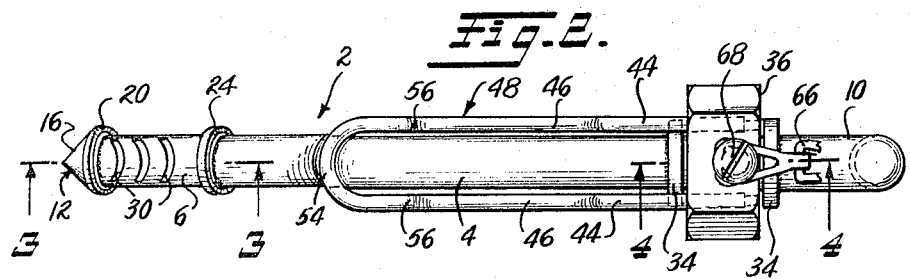
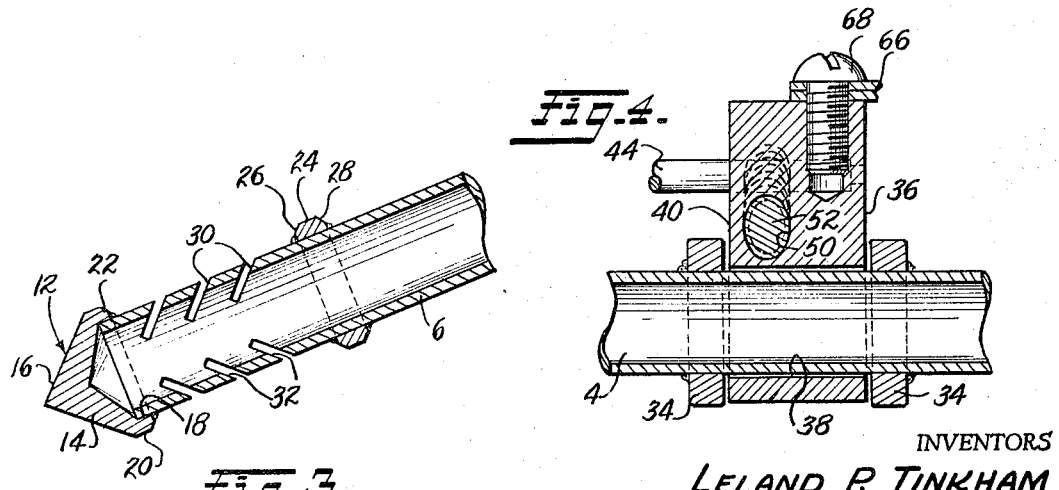
INVENTORS
LELAND P. TINKHAM
CARL J. ASMUS
BY
Bacon & Thomas
ATTORNEYS May 14, 1968  L. P. TINKHAM ET AL  3,382,721
PROBE FOR COLLECTING EXHAUST GAS
Filed Oct. 4, 1965  2 Sheets-Sheet 2
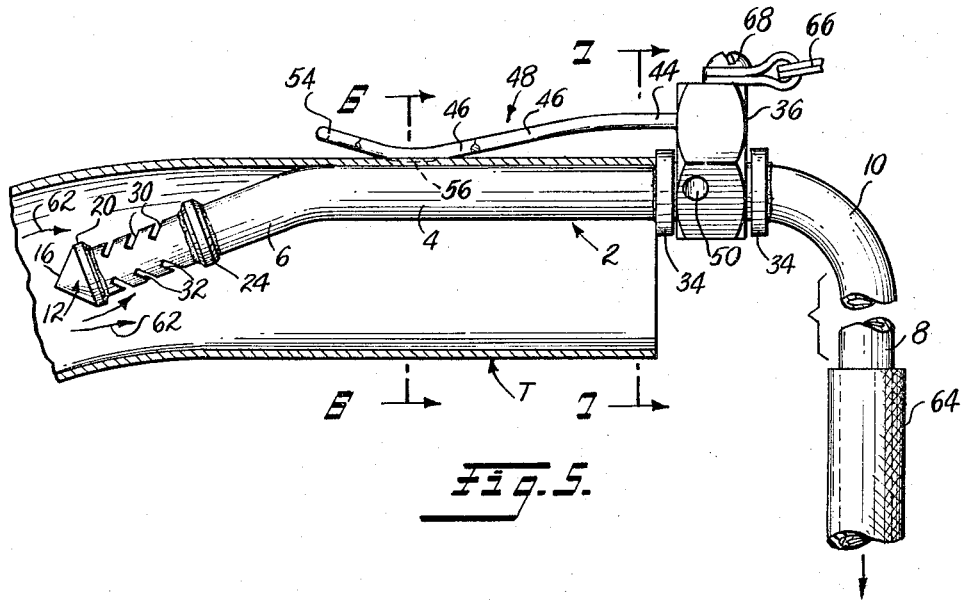
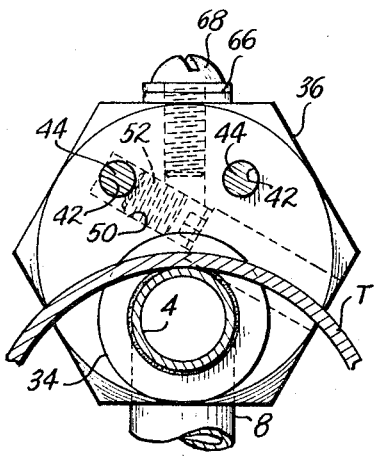
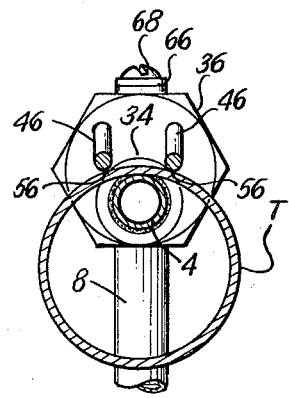
INVENTORS
LELAND P. TINKHAM
CARL J. ASMUS
BY Bacon & Thomas
ATTORNEYS

United States Patent Office 3,382,721
Patented May 14, 1968

3,382,721
PROBE FOR COLLECTING EXHAUST GAS
Leland P. Tinkham and Carl J. Asmus, Temple City, Calif., assignors to Clayton Manufacturing Company, El Monte, Calif., a corporation of California
Filed Oct. 4, 1965, Ser. No. 492,618
18 Claims. (Cl. 73—421.5)

ABSTRACT OF THE DISCLOSURE

A probe for collecting the exhaust gas from an internal combustion engine for analysis purposes. The probe is designed to be inserted into the end of the exhaust pipe and a spring clip is provided to hold it in place. The gas inlet ports are so arranged that solid matter entrained in the exhaust gas is rejected from the collected sample.

---

This invention relates generally to probes for collecting a sample of a gas discharging through the end of a conduit, and more particularly to a probe designed for insertion into the open end of an engine exhaust or muffler tail pipe for collecting an exhaust gas sample without entraining solid contaminates.

The present probe can be used to continuously collect exhaust gas from the tail pipe of a vehicle, while being tested at various speeds and loads on a chassis dynamometer, for analysis to determine carburetor performance. In this connection, the probe of the invention is especially built to be easily inserted into the open end of various designs of vehicle tail pipes for collecting engine exhaust gas for analysis. The probe may be made entirely of rigid tubing, or partly of flexible tubing. The probe is usually connected with a pump for drawing the gas sample therethrough and delivering it to a suitable analyzer. Further, the probe is designed to minimize the possibility of the entry of particles of carbon, rust or other exhaust deposits, into the probe. A resilient clip is arranged on the main body portion of the probe to properly retain the probe in position within the open end of a tail pipe.

The principal object of the invention is to provide a gas sampling gun or probe designed for insertion into the open end of a muffler tail pipe, and to minimize the possibility of flecks of carbon, engine deposits, and other foreign matter entering the probe, both during withdrawal and insertion of the probe into the tail pipe, and during use of the probe to collect exhaust gas from said tail pipe.

Another object is to provide a sampling gun or probe for collecting exhaust gas designed and arranged to ensure that when the probe is inserted into the open end of a tail pipe it will automatically be properly positioned and retained in an optimum gas collecting attitude.

A further object is to provide an exhaust gas collecting device that can be easily mounted in a tail pipe, and readily removed by an unskilled operator without burning his hands.

A still further object is to provide a probe for collecting exhaust gas designed to fit within the tail pipe of substantially all current vehicles.

Still another object is to provide an exhaust gas probe that will collect exhaust gas from the center of a stream of gas discharging through a muffler tail pipe.

Other objects and advantages of the invention will become apparent from the following description, when taken in connection with the accompanying drawings, wherein:

FIG. 1 is a side elevational view of the exhaust sampling gun or probe of the invention having a flexible chain attached thereto for use in removing the probe from a hot muffler tail pipe;

FIG. 2 is a plan view of the exhaust probe of FIG. 1;

FIG. 3 is an enlarged fragmentary vertical sectional view, taken on the line 3—3 of FIG. 2, through the nose end of the probe;

FIG. 4 is an enlarged fragmentary vertical sectional view, taken on the line 4—4 of FIG. 2, showing the manner in which a ring member for carrying a resilient retaining clip is rotatably mounted on the main body portion of the probe;

FIG. 5 is a side elevational view showing the exhaust probe mounted in the open end of a muffler tail pipe, and particularly indicating how the design and arrangement of the probe and its resilient retaining clip cooperate to properly position and hold the probe in place for collecting exhaust gas from the center portion of the tail pipe;

FIG. 6 is a vertical sectional view, taken on the line 6—6 of FIG. 5; and

FIG. 7 is an enlarged fragmentary vertical sectional view, taken on the line 7—7 of FIG. 5.

Referring now to the drawings, the exhaust gas collecting probe is indicated generally at 2, and comprises a one-piece hollow tubular body including a main horizontally-disposed body portion 4, a downwardly inclined nose portion 6, a vertical rear portion 8, and an elbow portion 10 connecting the horizontal and vertical portions. The longitudinal axis of the inclined nose portion 6 extends downwardly at an angle of about 20° relative to the longitudinal axis of the horizontal main portion 4. As will be noted from FIG. 1, the body portion 4 has a length about twice that of the nose portion 6.

Referring in particular to FIG. 3, the end of the nose portion 6 has a tip 12 thereon in the form of a cap 14 having a conical external surface 16 on its forward end. The rear end 20 of the cap 14 is cylindrical and of substantially larger diameter than the nose portion 6, and has a centrally positioned socket 18, within which the forward end of said nose portion is received and secured, as by silver soldering. The rear end 20 of the cap 14 serves as a spacing collar and its edge 22 is chamfered so that it has no sharp corner that would scrape deposits off the inner wall of the tail pipe as the probe is being withdrawn.

About midway of its length, the nose portion 6 has a collar 24 secured thereon, as by silver soldering, the front and rear edges 26 and 28 of said collar being chamfered for the same reason as the edge 22. The collar 24 has an outer diameter substantially the same as the diameter of the collar 20, and the two collars 20 and 24 further function to prevent the probe surface between said collars from coming into direct contact with the inner surface of a tail pipe T, FIG. 5, into which the probe 2 is inserted.

The part of the nose portion 6 lying between the collars 20 and 24 has a plurality of axially and circumferentially spaced, rearwardly inclined radial slots 30 and 32 cut therein. The slots 30 are cut on the upper side of the nose portion 6 diametrically opposite the slots 32, which are cut in the lower side of said nose portion. The slots 30 and 32 are inclined relative to the longitudinal axis of the nose portion 6 on about a 45° angle, and their depth, measured normal to said axis, is equal to about one-third the external diameter of the nose portion 6.

Received and secured, as by silver soldering, on the main body portion 4, adjacent the elbow portion 10, is a pair of spaced washers 34. A hexagonal ring 36 is mounted on the main body portion 4 between the washers 34. The ring 36 has an opening 38 below its axis and extending therethrough for receiving the main body portion 4. The opening 38 is of slightly larger diameter than main body portion 4, and the axial thickness of the ring 36 is slightly less than the distance between the confronting faces of the washers 34. Thus, the ring 36 is freely rotatable on the main body portion 4.

Extending into the front face 40 of the ring 36 about the opening 38, and symmetrically positioned about a vertical line passing through the center of the opening 38, is a pair of bores 42. Received within the bores 42 are the free ends 44 of legs 46 of a U-shaped resilient retaining clip 48. A transversely extending countersunk threaded bore 50, FIG. 7, intersects one of the bores 42, and contains a set screw 52 for securing one of the leg ends 44 in position.

As is best shown in FIG. 2, the clip 48 is generally U-shaped in plan view, with the confronting surfaces on the legs 46 spaced apart a distance slightly greater than the diameter of the main body portion 4, said legs being interconnected by a U-bend portion 54. The clip 48 extends generally axially of the main body portion 4 from the ring member 36 to a zone near the nose portion 6.

The legs 44 extend horizontally for about one-fourth the length of the clip 48 and merge into the leg portions 46 which are then first bent downwardly at about a 15° angle and are then bent upwardly at about a 15° angle near the U-bend portion 54, whereby a pair of downwardly directed crimps 56 are formed. As is shown in FIG. 1, when the resilient clip 48 is in a relaxed condition, the U-bend 54 engages the top of the main body portion 4 and the lower surface of the crimps 56 extend below said top. This makes it easy for the tail pipe T to pass under the U-bend 54 as the probe 2 is inserted therein.

The clip 48 being made from resilient material, the legs 46 and the crimps 56 can be deflected upwardly, whereupon the resilience of said legs 46 causes the crimps 56 to engage the external surface of the tail pipe T and also causes the top surface of the main body portion 4 to engage the inner surface of said tail pipe, all as shown in FIG. 5.

It has been found that by analyzing the exhaust gas collected from an engine or muffler tail pipe, it is possible to diagnose the performance of the engine carburetor and to thereby ascertain engine efficiency. An analysis made of such exhaust gas can frequently be adversely affected by foreign particles, such as carbon flecks, engine deposits, tail pipe rust, and the like, entrained in the exhaust gas sample. It is, therefore, desirable that the exhaust gas sample be collected from the tail pipe in a manner so as to minimize the possibility of such foreign particles being entrained in the sample, and the probe 2 and its resilient clip 48 are especially designed for this purpose.

The probe 2 is shown in FIG. 5 installed within the open end of the tail pipe T. Such installation is easily accomplished by an inexperienced operator, merely by inserting the probe 2 so that the nose portion 6 thereof enters the open end of the tail pipe, with the clip 48 engaging the outer surface of said tail pipe. The clip 48, and in particular the crimps 56, then function to retain the probe 2 in position and to engage the main body portion 4 with the inner wall of the tail pipe 58. With the probe 2 installed thusly, the downwardly inclined probe nose portion 6, and in particular the slots 30 and 32, are positioned in the central portion of the tail pipe T, away from the walls thereof and in the path of the stream of exhaust gas. It should be noted that regardless of whether the clip 48 is positioned on the top, side or bottom of the pipe 58, the angled nose portion 6 will always extend into the central portion of said tail pipe. Normally, however, the clip 48 will be disposed with the crimps 56 engaging the top surface of the tail pipe T.

During initial insertion movement of the probe 2, the collars 20 and 24, being substantially larger in diameter than the nose portion 6, function to prevent the portion thereof containing the slots 30 and 32 from directly engaging the inner wall of the tail pipe T. Thus, the possibility of the edges of the slots 30 and 32 scraping particles of carbon, rust, and the like, from the inner surface of the tail pipe T during insertion of the probe 2 is eliminated, and this possible source of foreign matter is consequently eliminated.

The rear portion 8 of the probe 2 is connected to a conduit or hose 64, to the other end of which a positive displacement pump or the like (not shown) may be connected. The pump will tend to produce a vacuum condition within the probe 2, causing exhaust gas to be drawn into the probe through the slots 30 and 32. In addition, the back pressure of the exhaust gas within the tail pipe T will also cause the exhaust gas to flow, as indicated by the arrows 62, and enter the probe through the slots 30 and 32. The collected exhaust gas sample is then conducted by the hose 64 to any suitable exhaust gas analyzer.

Because the slots 30 and 32 are rearwardly inclined, the possibility of foreign particles and droplets of moisture, entrained in the exhaust gas flowing over the probe 2 in the direction of the arrows 62, entering the slots 30 and 32 is minimized.

The probe 2 will become quite hot when in use for any length of time on the tail pipe connected with a running engine. In order to provide for easy and safe removal thereof, one end of a chain 66 is fastened to the ring 36 by a screw 68. The other end of the chain 66 has a circular handle 70 attached thereto. Thus, the probe 2 can be easily removed from a tail pipe by merely grasping the handle 70, and then pulling on the chain 66.

The dimensions of the probe 2 will vary depending upon the intended use thereof, and the probe can obviously be used otherwise than with a muffler tail pipe. However, for the broadest general tail pipe use, the outer diameter of the probe 2 will be uniform and be about 0.38 inch. The diameter of the collars 20 and 24 is about 0.5 inch. The axial distance between the collars 20 and 24 is about 0.75 inch, and the slots 30 and 32 have a width of about 0.025 inch.

Obviously, many modifications and variations of the invention are possible in the light of the above teachings.

For example, the main body portion 4 and a part of the nose portion 6 can be made of fairly rigid but flexible tubing, and the ring 36 and collars 34 can be mounted upon such tubing. The slotted part of the nose portion 6 would, of course, be made from rigid tubing. The elbow portion 10 and the extended portion 8 can be made from rigid tubing with the elbow suitably joined to the adjacent end of the flexible body portion. The flexible tubing is rigid enough to cooperate with the resilient clip 48 to hold the probe on the end of a tail pipe. At the same time, the tubing is flexible enough to conform to a tail pipe outlet end that has some curvature to it.

Accordingly, it is to be understood that within the scope of the appended claims, the invention may be practiced otherwise than as specifically described.

We claim:

1. A probe for insertion into the open end of a muffler tail pipe or the like to collect engine exhaust gas therefrom, comprising: a tubular member including a main body portion having an extension from the end thereof providing a nose portion with a closed end; a pair of axially spaced collars on said nose portion, the region of said nose portion between said collars having a plurality of openings extending therethrough inclined in a direction away from said closed end; and means connected with said main body portion for removably retaining said probe within the open end of a tail pipe.

2. A probe for insertion into the open end of a muffler tail pipe or the like to collect engine exhaust gas therefrom, comprising: a tubular member, including a main body portion, and a nose portion extending from and being at an angle relative to said main body portion; a pair of axially spaced collars on said nose portion, the region of said nose portion between said collars having a plurality of openings therethrough, said main body portion having means remote from said nose portion for connecting said tubular member to a conduit for conducting away exhaust gas collected by said probe; and means, including a resilient element connected with said main body portion and arranged to cooperate with said main body portion for removably retaining said probe within the open end of a tail pipe.

3. A probe as recited in claim 2, wherein the openings in the nose portion are inclined toward the main body portion of the tubular member.

4. A probe as recited in claim 2, wherein the forward end of the inclined nose portion is closed by a conical tip secured thereto, and wherein one of said spaced collars is formed by a cylindrical portion on said conical tip.

5. A probe as recited in claim 2, wherein the retaining means includes a ring member rotatably mounted upon the main body portion of the tubular member, and wherein the resilient element is secured at one end thereof to said ring member and extends axially of the main body portion toward said nose portion.

6. A probe for insertion into the open end of a muffler tail pipe or the like to collect engine exhaust gas therefrom, comprising: a tubular member having a main body portion, and a nose portion extending from and being inclined at an angle relative to said main body portion; a conical tip secured to said nose portion and forming a closure therefor, said conical tip including a cylindrical portion at the base thereof having a diameter substantially greater than the external diameter of said nose portion and serving as a first collar; a second collar on said nose portion, spaced axially from said first collar and also having a diameter substantially greater than that of said nose portion, the region of said nose portion between said axially spaced collars having a plurality of axially and circumferentially spaced, slot openings therein inclined in a direction away from said conical tip; and means connected with said probe operable to removably retain said probe within the open end of a tail pipe.

7. A probe as recited in claim 6, wherein the longitudinal axis of the nose portion is inclined relative to the axis of the main body portion of said probe on about a 20 degree angle, and wherein the slot openings in the nose portion are inclined on about a 45 degree angle relative to the longitudinal axis of said nose portion.

8. A probe as recited in claim 6, wherein the retaining means includes: a ring member rotatably mounted on the main body portion at a point remote from the nose portion; means carried by the main body portion to restrain said ring member against axial movement on said main body portion; and a resilient element secured at one end thereof to said ring member, and extending axially of said main body portion toward the nose portion of said main body portion and having a portion engaged with said main body portion when not in use.

9. A probe as recited in claim 8, wherein the resilient member is substantially U-shaped and includes a pair of generally parallel resilient legs joined together at one end by a U-bend, the other end of said legs being secured to the ring member and being spaced radially from the main body portion, and wherein the legs are bent to provide crimp portions near their joined end which are engageable with the external surface of a tail pipe when the probe is mounted therein.

10. A probe as recited in claim 8, including a flexible element secured at one end thereof to the ring member, and operable by pulling thereon to remove said probe from the open end of a tail pipe when mounted therein.

11. In a probe structure for insertion into the open end of a muffler tail pipe or the like to collect engine exhaust gas therefrom, a tubular member comprising: a main body portion having an extension from the end thereof providing a nose portion with a closed end, said nose portion being inclined at an angle relative to said main body portion; a pair of axially spaced collars carried by said nose portion, the region of said nose portion between said collars having a plurality of openings extending therethrough inclined in a direction away from the closed end of said nose portion, said main body portion having an elbow portion at its other end, and an extension projecting from said elbow.

12. A probe structure as defined in claim 11, wherein the nose portion extends from the main body portion on an angle of about 20 degrees, and wherein the extension from the elbow is on an angle of about 90 degrees relative to the main body portion.

13. A probe for insertion into the open end of an engine tail pipe to collect exhaust gas, comprising: a tubular member, including a main body portion, and a nose portion inclined relative to and extending from said main body portion; a conical tip secured to and closing the end of said nose portion, said tip having a cylindrical collar on the rear end thereof of a diameter substantially greater than the external diameter of said nose portion; an annular collar on said nose portion spaced axially from said cylindrical coller and having a diameter substantially greater than that of said nose portion, the wall of said tubular nose portion between said axially spaced collars having a plurality of axially and circumferentially spaced, rearwardly facing slot openings therein; means on the other end of said tubular member for connecting said member to a conduit for conducting away exhaust gas collected through said nose portion; and means carried by said main body portion operable to detachably retain said probe within the open end of an engine tail pipe, including a ring mounted upon the outer end of said main body portion of said tubular member; and a resilient element secured to said ring and extending axially forwardly of said main body portion toward said nose portion, said resilient element including crimped portions near the forward end thereof disposed to confront said main portion of said tubular member when not in use, and being operable when said probe is inserted within the open end of a tail pipe to hold said main body portion of said tubular member in engagement with the inner wall of said tail pipe.

14. A probe as recited in claim 13, wherein the resilient member is U-shaped and includes a pair of generally parallel resilient legs connected at their forward end by a U-bend, the other end of said legs being secured to said ring member and being spaced radially from said probe, said legs being bent to provide said crimp portions near their forward ends, and said U-bend engaging the main body portion when the probe is not in use.

15. A probe structure as defined in claim 11, wherein, the main body portion between the elbow portion and the adjacent collar of the nose portion is made of flexible tubing.

16. A probe for insertion into the open end of a muffler tail pipe or the like to collect engine exhaust gas therefrom, comprising: a tubular member including a main body portion having an extension from the end thereof providing a nose portion with a closed end; and axially spaced means on said nose portion for maintaining the region of said nose portion between said axially spaced means out of contact with the tail pipe, said region having a plurality of openings extending therethrough inclined in a direction away from said closed end.

17. A probe for insertion into the open end of an internal combustion engine exhaust pipe or the like to collect engine exhaust gas therefrom, comprising: a tubular member having at least one opening through its sidewall adjacent one end thereof, said opening being inclined relative to the axis of said tubular member and in a direction away from said one end, said opening having an inlet facing downstream relative to the direction of exhaust gas flow, whereby the exhaust gas velocity pressure in said tail pipe will not force gas into said inlet and through said opening into said tubular member, said tubular member having an outlet at its other end for connection with pump means for inducing suction in said tubular member to pull exhause gas thereinto through said opening.

18. A probe as recited in claim 17, wherein means is provided on the tubular member arranged to prevent an opening from contacting the inner wall surface of the tail pipe during insertion of the tubular member into said tail pipe.

References Cited
UNITED STATES PATENTS 3,284,165　11/1966　Baumann et al. _____ 340—237

FOREIGN PATENTS 796,010　6/1958　Great Britain.

LOUIS R. PRINCE, *Primary Examiner.*

S. CLEMENT SWISHER, *Examiner.*